United States Patent [19]
Ajimu et al.

[11] Patent Number: 5,729,329
[45] Date of Patent: Mar. 17, 1998

[54] IMAGE PRINTING METHOD

[75] Inventors: Shuji Ajimu; Mitsukazu Hosoya, both of Kanagawa, Japan

[73] Assignee: Fuji Photo Film Co., Ltd., Kanagawa

[21] Appl. No.: 670,579

[22] Filed: Jun. 26, 1996

[30] Foreign Application Priority Data

Jun. 30, 1995 [JP] Japan ................ 7-165998
Jun. 30, 1995 [JP] Japan ................ 7-165999

[51] Int. Cl.$^6$ ............................. G03B 27/32; G03B 27/52
[52] U.S. Cl. ................... 355/40; 355/41; 355/54; 355/77
[58] Field of Search ................ 355/40, 41, 42, 355/54, 75, 77, 89; 358/487, 302

[56] References Cited

U.S. PATENT DOCUMENTS

| | | | |
|---|---|---|---|
| 4,805,039 | 2/1989 | Otake et al. | 358/335 |
| 4,966,285 | 10/1990 | Otake et al. | 206/455 |
| 5,274,418 | 12/1993 | Kazami et al. | 355/40 |
| 5,447,827 | 9/1995 | Ishikawa et al. | 355/54 |
| 5,477,331 | 12/1995 | Yamaguchi et al. | 358/302 |
| 5,508,783 | 4/1996 | Iwagaki et al. | 355/40 |
| 5,563,984 | 10/1996 | Tanibata | 355/40 |
| 5,576,836 | 11/1996 | Sano et al. | 358/302 |
| 5,600,498 | 2/1997 | Motooka et al. | 355/41 |
| 5,608,542 | 3/1997 | Krahe et al. | 358/449 |
| 5,633,725 | 5/1997 | Nishida et al. | 358/302 |

FOREIGN PATENT DOCUMENTS

| | | | |
|---|---|---|---|
| 61-122639 | 6/1986 | Japan | G03B 27/32 |
| 6-190586 | 7/1994 | Japan | B23K 35/28 |

*Primary Examiner*—A. A. Mathews
*Attorney, Agent, or Firm*—Sughrue, Mion, Zinn, Macpeak & Seas, PLLC

[57] ABSTRACT

In a printer processor, magnetic information is read out from a negative film by a magnetic head unit while the negative film is transported on a negative film carrier. Further, the density of each image is measured by an optical sensor of a sensor unit so as to detect a blank frame and an improperly exposed frame, thereby selecting images to be printed. After determining the print size of the selected images, a last image to be printed last, and a second last image to be printed before the last image is printed are specified. Based on the print sizes of the last image and the second last image, the printing order is determined before printing is performed.

8 Claims, 10 Drawing Sheets

IMAGE PRINTING METHOD

BACKGROUND OF THE INVENTION

1. Field of the Invention

The present invention relates to an image printing method, and particularly to an image printing method for printing onto a photosensitive material an image recorded in a recording area of a photographic film.

2. Description of the Related Art

Generally, as many images as possible are continuously recorded on a recording area of one roll of photographic film. Therefore, during a developing process, images recorded on the photographic film are printed sequentially onto a photosensitive material, starting from the image located at the leading end of the print area of the film in the feed direction of the film.

In recent years, to readily find out what images are recorded on a developed film, index printing has been proposed in which frames are printed in a reduced size and arranged in a matrix, as disclosed, for example, in Japanese Patent Application Laid-Open (JP-A) No. 61-122639. In relation to this index printing, the present applicant has proposed a photographic printer which continuously produces both the above-mentioned index print and frame-by-frame images onto the photosensitive material without affecting the printer's high-speed processing performance (see Japanese Patent Application Laid-Open (JP-A) No. 6-190586).

This photographic printer has a main printing section for printing onto a photographic printing paper images recorded on one roll of film (hereinafter referred to as "ordinary print image"), as well as a sub-printing section for printing an image of the index print (hereinafter referred to as an "index print image") onto the photographic printing paper.

In this sub-printing section, the index print image is displayed on a color CRT, and the displayed image is focused onto a photosensitive material through a printing lens, thereby printing the index print image onto the photosensitive material. In order to reduce the size of the photographic printer, a technique has been proposed in which a liquid crystal panel, which can control the gradation (transmission density) of each pixel through current control, is used in place of the color CRT. In this technique, an index print image is formed on the liquid crystal panel for each of three colors (read, green and blue), and each of the thus formed images sequentially undergoes exposure using light of the corresponding color.

However, in such a conventional photographic printer, a problem occurs when ordinary print images and an index print image are continuously printed onto a common photographic printing paper, for example, in a simultaneous print process. That is, since there are a plurality of sizes of enlargement (standard size, L size, panoramic size, etc.), there is a possibility that a blank area where no image is printed may be formed on the photographic printing paper between the portion containing the ordinary print images and the portion containing the index print image. This results in waste of photographic printing paper. In order to decrease this waste, the photographic printing paper may be reversed in the direction of its feed during printing. However, this kind of processing takes more time, and it becomes more complicated to control the amount of feed of the photographic printing paper.

In about 30 percent of photographic films to be developed, the number of actually recorded images is smaller than the maximum recordable number of images. When a photographic film which is not fully used undergoes sequential printing of frames, starting from the leading end in the feed direction, nothing is printed onto the photosensitive material at portions corresponding to blank portions on the film. The index print, if produced, does not need to contain such blank frames as an index. In some cases, an image may not need to be printed because it is apparent that its print will be too poor in quality to produce due to its poorly recorded state. For example, when an image suffering an inadequate exposure is printed, the resulting print may be too dark or light and hence may be useless. Printing such an image that will be finally discarded as a useless print is a waste of time and photosensitive material. In addition, removing such a useless print after printing is completed is a waste of labor.

SUMMARY OF THE INVENTION

The present invention has been accomplished in view of the above-mentioned problems. An object of the present invention is to provide an image printing method capable of efficiently printing images recorded on a photographic film onto a common photosensitive material using an apparatus having a plurality of exposure sections.

The first aspect of the present invention is an image printing method comprising the steps of: disposing two exposure stages above a common photosensitive material, said two stages being separated from each other by a predetermined distanse; printing images sequentially at the stage disposed downstream in the feed direction of said photosensitive material; locating, at the stage disposed upstream in the feed direction of said photosensitive material, an image to be printed adjacent to the last image to be printed last at said downstream exposure stage; wherein the image at said upstream exposure stage is located such that the near edge of the image is located at a position separated from the optical axis of said downstream exposure stage by at least a minimum distance of $L_1+L_2/2$, where $L_1$ is the length of the last image to be printed last at said downstream stage and $L_2$ is the length of an image preceding the last image; and determining, based on $L_1$ and $L_2$, an image to be printed at said upstream exposure stage prior to the last image to be printed at said downstream exposure stage The second aspect of the present invention is an image printing method according to the first aspect, wherein said image to be printed at said upstream exposure stage is previously divided into a plurality of division images, and further comprising the step of determining for each of the division images whether or not the division image is printed at said upstream exposure stage before the last image is printed at said downstream image.

The third aspect of the present invention is an image printing method according to the first or the second aspect, wherein said image to be printed at said upstream exposure stage is an index print image, and further comprising the step of determining an n which satisfies the following Eqs. (i) and (ii):

$$L_1/2 + \sum_{i}^{n-1} l_i < M \quad \text{(i)}$$

$$L_1/2 + \sum_{i}^{n} l_i \geq M \quad \text{(ii)}$$

and printing images in the order of $P_2, X_1, X_2, \ldots, X_{n-1}, P_1, X_n, X_{n-1}, \ldots,$ and $X_{MAX}$, where $l_i$ is the length of division image $X_i$, MAX is the maximum value of i, $L_1$ is the length of the last image $P_1$, $L_2$ is the length of the second last image $P_2$, and M is the minimum value of $L_1+L_2/2$.

According to the first aspect, taking the length of the last image as $L_1$ and the length of the second last image as $L_2$ the printing area at the upstream exposure stage is determined such that the near edge of the printing area is located at a position separated from the optical axis of the downstream exposure stage by at least a minimum distance of $L_1+L_2/2$ (i.e., a distance of $L_1+L_2/2$ when both the last and second last images have a shortest length). A portion of an auxiliary image which undergoes exposure at the upstream exposure stage prior to the last image is determined based on $L_1$ and $L_2$. Such a portion of the auxiliary image is printed before the last image is printed. The remaining portion of the auxiliary image is printed at the upstream exposure stage after the last image is printed. When the auxiliary image is smaller than the printing area in the upstream exposure stage, the auxiliary image will be printed at a time. When the auxiliary image is greater than the printing area, the auxiliary image is printed in a divided manner.

Accordingly, even when images are printed at the downstream exposure stage in different printing sizes, no blank area is formed between ordinary image printed at the downstream exposure stage and an auxiliary image printed at the upstream exposure stage. Thus, images can be efficiently printed onto a common photosensitive material while the photosensitive material is fed in merely a single direction.

According to the second aspect, an auxiliary image to be printed at the upstream exposure stage is previously divided into a plurality of division images. In addition, before the last image is printed at the downstream exposure stage, a determination is made as to whether or not each of the division images is to be printed at the upstream exposure stage. Since the above-described determination is made based on the predetermined size of the division image and the sizes of images to be printed at the downstream exposure stage, it can be readily determined whether or not each of the division images is to be printed at the upstream exposure stage.

According to a third aspect of the present invention, ordinary print images and an index print image are printed continuously in accordance with a predetermined equation. That is, taking the length of division image $X_i$ as $L_i$ ($_{MAX}$ is the maximum value of i), the length of the last image $P_1$ as $L_1$, the length of the second last image $P_2$ as $L_2$, and the minimum value of $L_1+L_2/2$ as M, an n-th division image which satisfies the following Eqs. (1) and (2) after the second last image $P_2$ is printed is determined.

$$L_1/2 + \sum_{i}^{n-1} l_i < M \tag{1}$$

$$L_1/2 + \sum_{i}^{n} l_n \geq M \tag{2}$$

Before the n-th division image $X_n$ is printed, the last image $P_1$ is printed. Accordingly, images are printed in the order of $P_2$, $X_1$, $X_2$, ..., $X_{n-1}$, $P_1$, $X_n$, $X_{n-1}$, ..., and $X_{MAX}$. Thus, when the length of the last image $P_1$ and the length of each of the division images of the index print image are determined, the order of exposure can be readily determined using Eqs. (1) and (2) above.

The index print image is a collection of images which are obtained by printing, in a reduced size, ordinary images recorded on a photographic film and which are arranged in a matrix. A single index print image, which contains ordinary images recorded on the photographic film, a heading, and the like, is divided into division images in accordance with the size of image displaying means provided at the upstream exposure section. The division images of the index print image are successively displayed on the image displaying means, and printed one portion at a time or by a plurality of times of printing.

The fourth aspect of the present invention is an image printing method comprising the steps of: disposing two exposure stages above a common photosensitive material, said two stages being separated from each other by a predetermined distanse; printing images sequentially at the stage disposed downstream in the feed direction of said photosensitive material; locating, at the stage disposed upstream in the feed direction of said photosensitive material, an image to be printed adjacent to the last image to be printed last at said downstream exposure stage; selecting images to be printed at said downstream exposure stage, through a judgment based on image information obtained from the photographic film; specifying, among the selected images, a last image to be printed last, and a second last image to be printed before the last image is printed; and determining, based on the sizes of the last image and the second last image, an image to be printed at said upstream exposure stage prior to the last image.

The fifth aspect of the present invention is an image printing method according to the fourth aspect, wherein the image information used in said judgment is either magnetic information or optical information recorded on the photographic film, and further comprising the steps of: feeding the photographic film forward and backward; reading said image information from the photographic film while the film is fed forward; and printing images while the film is fed backward.

The sixth aspect of the present invention is an image printing method according to the fourth or the fifth aspect, wherein said image to be printed at said upstream exposure stage is an index print image composed of said selected images, said index print image is previously divided into a plurality of division images, and further comprising the step of determining for each of the division images whether or not the division image is to be printed before the last image is printed.

According to the fourth aspect, images to be printed are selected based on image information obtained from the photographic film. Among the thus selected images are specified a last image to be printed last, and a second last image to be printed before the last image is printed. For example, even in the case of a photographic film having an unused portion, only recorded images are selected for printing. Further, when there is an area (hereinafter referred to as a blank frame) where no image is recorded and which is located between images recorded on a photographic film, the blank frame is not selected.

When a single photosensitive material is fed along two exposure stages, the photosensitive material passes the upstream exposure stage and then passes the downstream exposure stage. In this case, based on the sizes of the Last and second last images in a group of images selected as above, a portion of the auxiliary image which is to undergo printing at the upstream exposure stage prior to the last image is determined. The thus determined portion of the auxiliary image undergoes printing at the upstream exposure stage before the last image undergoes exposure. The remaining portion of the auxiliary image to be printed at the upstream exposure stage undergoes exposure after the last image undergoes exposure. If the auxiliary image is smaller than the printing area in the upstream exposure stage, the auxiliary image is printed at a time.

Accordingly, only images desirable for printing are selected while a blank frame or the like is not selected.

Based on the sizes of the last and second last images among the thus selected images, the exposure stages are used alternately for printing. Thus, the minimum required amount of the photosensitive material can be determined in advance, thereby preventing a blank frame from being printed onto the photosensitive material and shortening the processing time.

Thus, images recorded on the photographic film can be efficiently printed onto a common photosensitive material.

According to the fifth aspect, magnetic information or optical information recorded on the photographic film is used for selecting images to be printed. The magnetic information is recorded onto a magnetic recording layer provided on the photographic film. A magnetic head, for example, contacts the magnetic recording layer which slides on the magnetic head, thereby reading the magnetic information from or recording the same onto the magnetic recording layer. In contrast, the optical information provides information regarding transmission density or the like, based on which it is possible detect the presence/absence of an image as well as the transmission density of the image. Based on the transmission density of an image, it is possible to select an image which will not be satisfactorily printed even by adjusting the exposure time. In addition, the photographic film can be fed forward and backward. The image information is read from the photographic film while it is fed forward. Then, based on the read information, the photographic film undergoes printing while it is fed backward. Thus, only those images desirable for printing are selected and printed based on various kinds of information collected while the photographic film is fed forward. This prevents an undesirable image from being printed onto the photosensitive material and enhances quick processing of proper images.

According to the sixth aspect, the index print image is composed of selected images and printed onto the photosensitive material together with the selected images. Accordingly, the index print image does not contain those images which are not printed. In addition, based on the last image, the index print image can be efficiently printed in which the above-described judgment is performed for each of the division images which contain selected images only.

DESCRIPTION OF PREFERRED EMBODIMENTS

Embodiments of the present invention will now be described with reference to the drawings.

First embodiment

Figure 1:
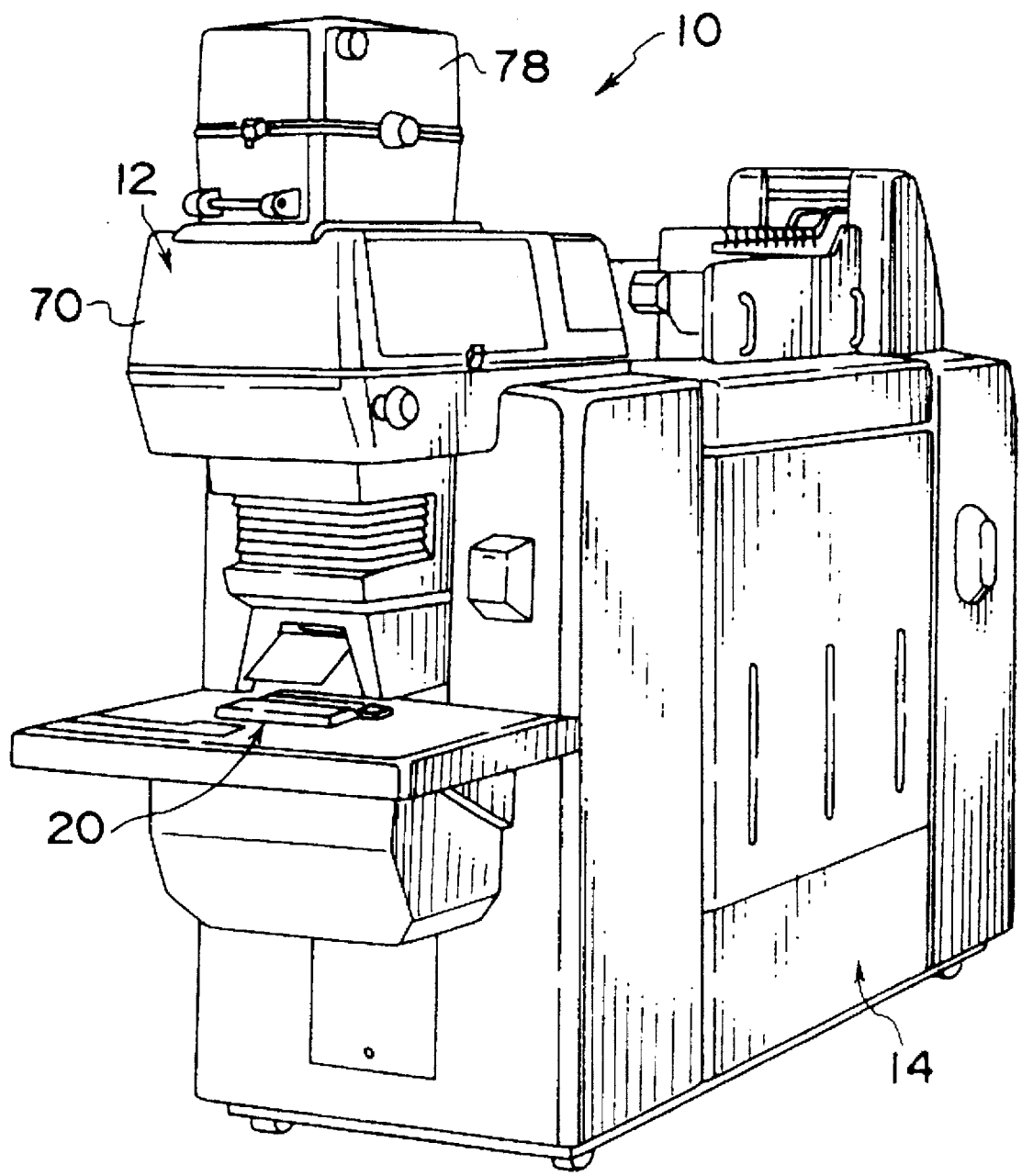
FIG. 1 is a perspective view illustrating a printer processor according to the present invention.

FIG. 1 shows a printer processor 10 according to the present invention and which is composed of a printer unit 12 and a processor unit 14.

Figure 2:
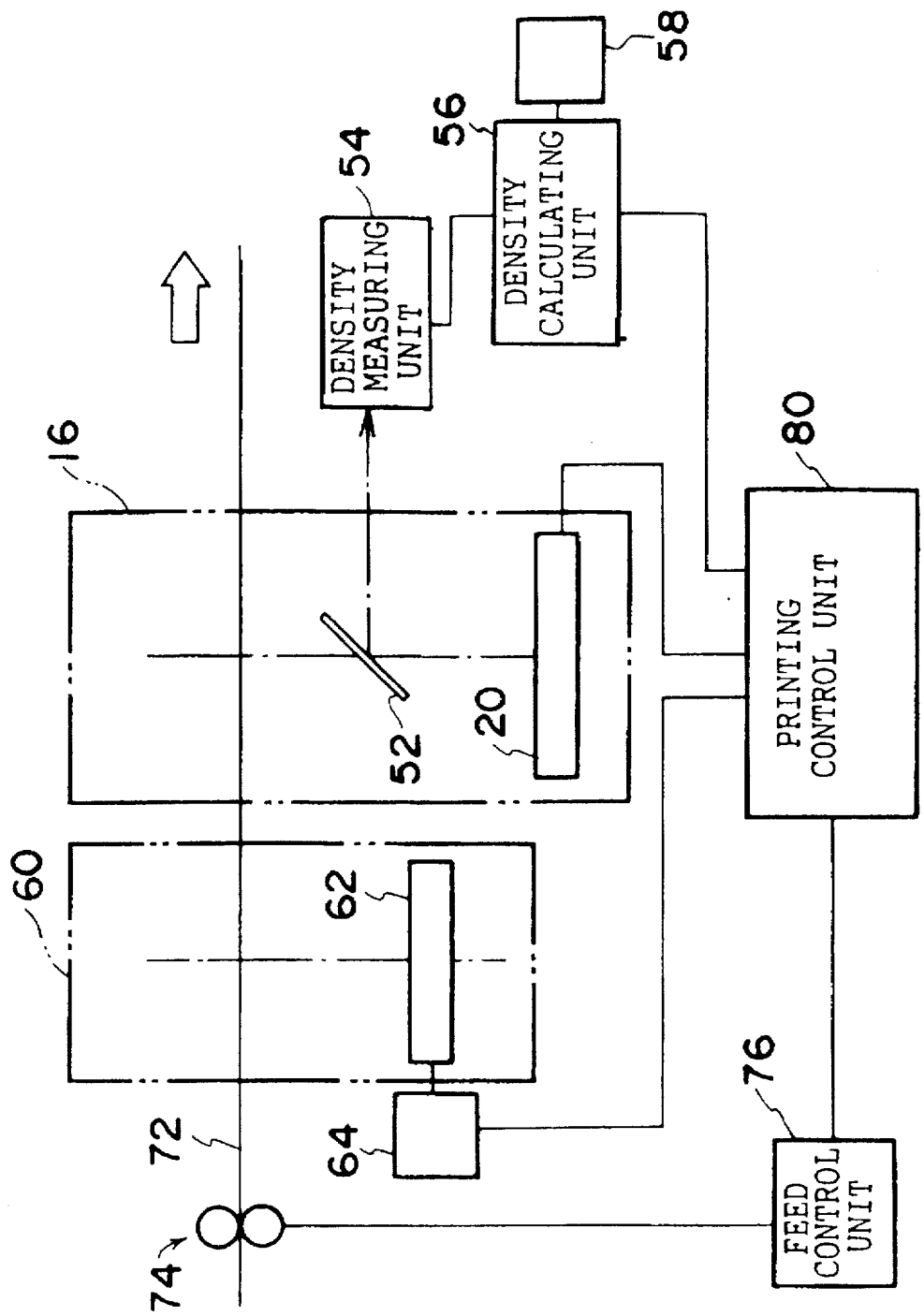
FIG. 2 is a schematic diagram illustrating the structure of the printer processor shown in FIG. 1.

As shown in FIG. 2, the printer unit 12 has a main exposure section 16 and a sub-exposure section 60. The main exposure section 16 performs exposure for printing an image in each image frame 18A of a negative film 18 (see FIG. 3) carried on a negative film carrier 20. The sub-exposure section 60 has a liquid crystal panel 62 and produces an index print which contains index images of those images recorded on the negative film 18.

In the printer unit 12, light emitted from the light source of each of the main exposure section 16 and the sub-exposure section 60 reaches a printing section 70. In the printing section 70, a photographic printing paper 72 pulled out from a paper magazine 78 is disposed. Rays of light passing through each of the negative film carrier 20 and the liquid crystal panel 62 are focused onto the photographic printing paper 72, thereby printing predetermined images onto the photographic printing paper 72. The photographic printing paper 72 on which images are printed is transported to a processor unit 14 so as to undergo a developing process composed of color development, bleach-fix, washing, drying, etc. The thus developed photographic printing paper 72 is cut frame by frame, thereby producing photographic prints.

Figure 3:
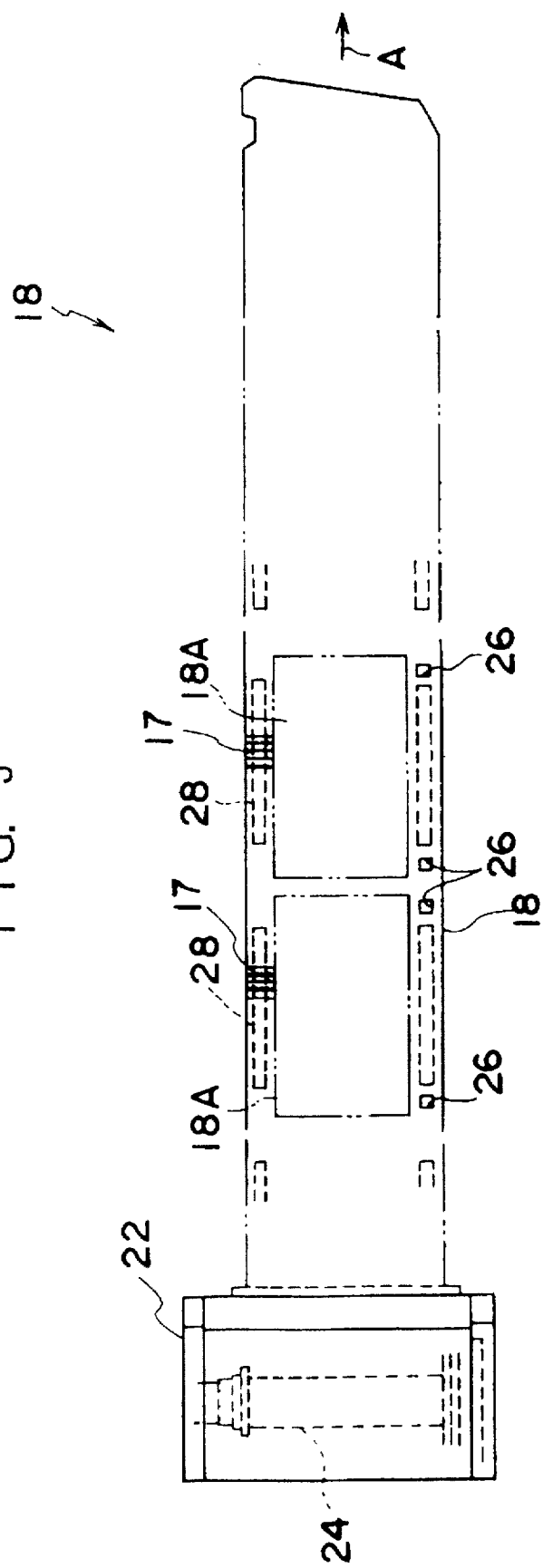
FIG. 3 is a schematic plan view of a negative film used in the present invention.

As shown in FIG. 3, the negative film 18 carried on the negative film carrier 20 is engaged at its one end with a spool shaft 24 of a cartridge 22 and wound around the spool shaft 24 in layers within the cartridge 22. In addition, a number of image frames 18A, in each of which an image is recorded, are present on the negative film 18 at predetermined intervals along the longitudinal direction of the negative film 18. Perforations 26 are formed in the negative film 18 along either of its lateral side edges such that the perforations 26 correspond to each image frame 18A. The perforations 26 make it possible to detect the area corresponding to each image frame 18A of the negative film 18. A magnetic track 28 where magnetic information is recorded is provided on the negative film 18 between perforations 26 and along a corresponding image frame 18A.

A code 17 for identifying the negative film 18 is provided on the negative film 18 along its side edge opposite to its another side edge along which the perforations 26 are provided.

The magnetic tracks 28 are formed on the back surface of the negative film 18 so that they face outside when the negative film 18 is taken up within the cartridge 22. The magnetic track 28 contains various kinds of information such as photographing conditions and data for an image recorded in each of the image frames 18A, and print size, exposure conditions, etc., used in printing. A magnetic head contacts the back surface of the negative film 18 which slides on the magnetic head, thereby writing magnetic information onto and reading the same from the magnetic track 28.

Figure 4:
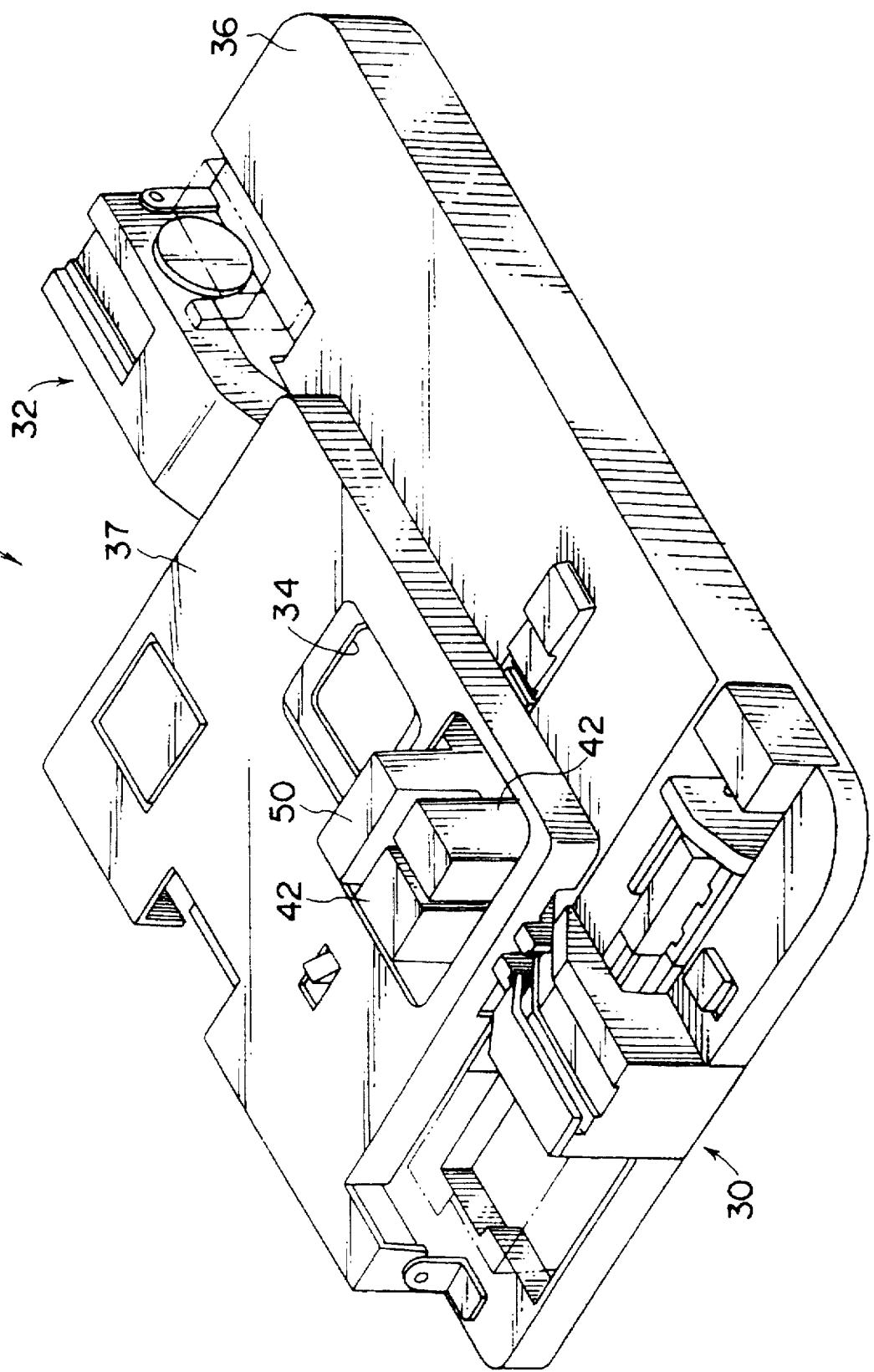
FIG. 4 is a perspective view illustrating a negative film carrier attachable to the printer processor shown in FIG. 1.

As shown in FIG. 4, the negative film carrier 20, which is disposed in the main exposure section 16 between a light source and the photographic printing paper 72, has a cartridge loading portion 30 and a film receiving portion 32. The above-mentioned cartridge 22 is loaded onto the cartridge loading portion 30 at its one end. The film receiving portion 32 receives the negative film 18 pulled out from the cartridge 22. An opening 34 is provided between the cartridge loading portion 30 and the film receiving portion 32 and at a position where the optical axis of the main exposure section 16 passes through. Rays of light pass through an image frame 18A located at the opening 34 and then are focused onto the photographic printing paper 72 disposed on the downstream side of the main exposure section 16 in the light propagating direction.

Figure 5:
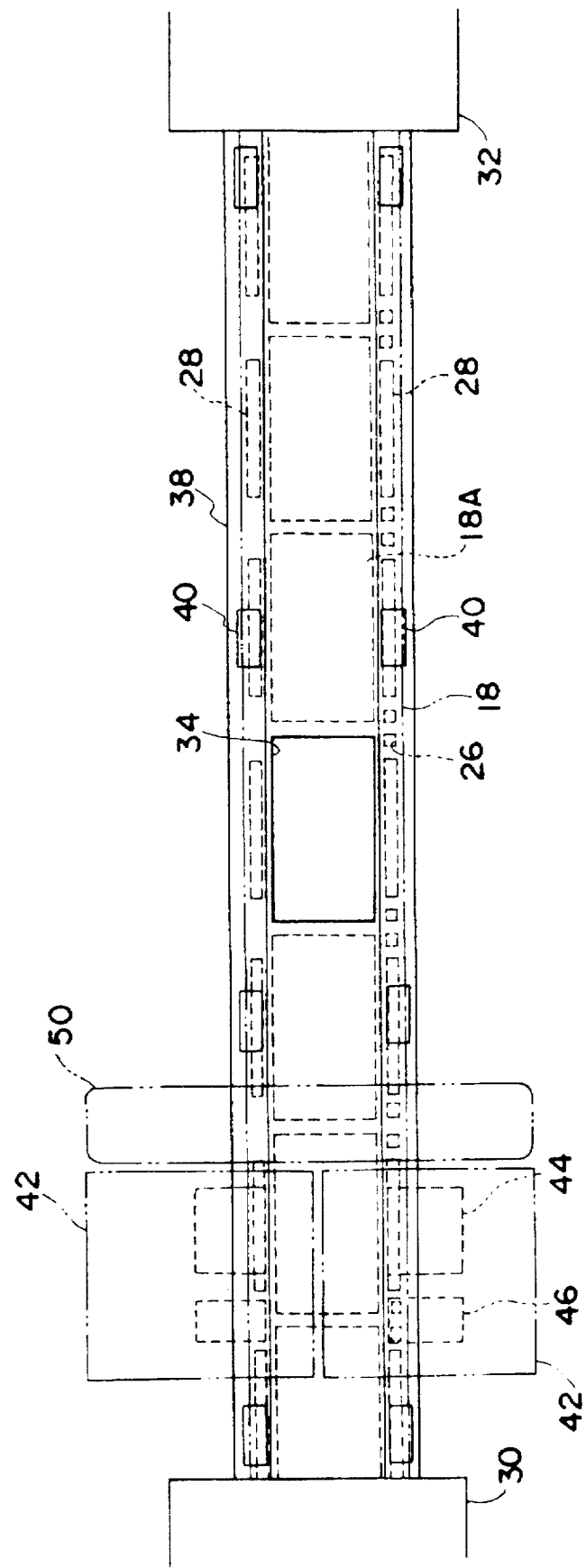
FIG. 5 is a schematic plan view illustrating the transport path and its peripherals of the negative film carrier shown according to the first embodiment of the present invention.

As shown in FIG. 5, a transport path 38 is provided on the top surface of a base portion 36, which is located between the cartridge loading portion 30 and the film receiving portion 32, such that the transport path 38 traverses the opening 34. A plurality of feed rollers 40 are disposed at predetermined intervals along both lateral side edges of the transport path 38. The feed rollers 40 pull out the negative film 18 from the cartridge loading portion 30 and feed it onto the transport path 38 such that the negative film 18 traverses the opening 34 and reaches the film housing unit 32 (forward feed). When the rotational direction of the feed rollers 40 reverses, the negative film 18 is fed backward from the film receiving portion 82 to the cartridge loading portion 30 so as to be rewound into the cartridge loading portion 30 (backward feed). The central portion of the negative film carrier 20 is covered with a cover 37.

The negative film carrier 20 has magnetic head units 42 and a sensor unit 50, both of which are located between the opening 34 and the cartridge loading portion 30 such that it is situated on the transport path 38.

As shown in FIG. 5, each magnetic head unit 42 has a read head 44 for reading magnetic information recorded on the magnetic track 28 of the negative film 18 and a record head 46 for recording magnetic information onto the magnetic track 28. The read head 44 and the record head 46 and backup rollers (not shown) disposed on the transport path 38 hold the negative film 18 therebetween, so that the read head 44 and the record head 46 slidingly contact the magnetic track 28 provided on the back surface of the negative film 18.

As shown in FIG. 5, in the magnetic head unit 42, when the image frame 18A to be subjected to exposure is positioned at the opening 34, the record head 46 is located between the magnetic tracks 28, one of which corresponds to the second image frame 18A on the cartridge loading portion 30's side of the image frame 18A to be subjected to exposure and the other of which corresponds to the third image frame 18A on the cartridge loading portion 30's side of the image frame 18A to be subjected to exposure. Accordingly, when the image frame 18A is positioned at the opening 34, the record head 46 is in contact with the unrecordable zone between the magnetic tracks 28, so that no information is recorded onto the negative film 18. By contrast, while the negative film 18 is fed intermittently so as to perform exposure for each of the image frames 18A, during the period of time between exposures, the record head 46 contacts a single strip of the magnetic track 28 corresponding to a single image frame 18A and sliding on the record head 46 at a constant speed, and hence the record head 46 records magnetic information onto the magnetic track 28.

On the other hand, the read head 44 is disposed adjacent to the record head 46 in each magnetic head unit 42. Accordingly, when the image frame 18A is positioned at the opening 34, the read head 44 is in contact with a portion of the magnetic track 28. While the negative film 18 is fed intermittently so as to bring each of the image frames 18A to the opening 34 for exposure of the image frame 18A, during the period of time between exposures, the read head 44 is slidingly in contact with two magnetic tracks 28 with the unrecordable zone located between the magnetic tracks 28. That is, the read head 44 is not slidingly in contact with a single strip of the magnetic track 28 traveling at a constant speed. Thus, while the negative film 18 is fed intermittently so as to perform exposure for each of the image frames 18A, the read head 44 does not read recorded magnetic information from the magnetic track 28. The read head 44 is adapted to read recorded magnetic information from the magnetic track 28 only when the negative film 18 is fed at a constant speed.

The read head 44 and the record head 46 are connected to a printing control unit 80 of the printer processor 10 shown in FIG. 2. The printing control unit 80 accumulates information received from the read head 44 and controls printing based on the accumulated information, and in addition sends information regarding printing conditions to the record head 46, which in turn records the printing information onto the corresponding magnetic track 28.

The sensor unit 50 is located between the magnetic head units 42 and the opening 34 and faces LEDs (not shown) provided on the cover 37.

The sensor unit 50 detects the perforation 26 using a optical sensor (not shown), thereby identifying the position of each image frame 18A recorded on the negative film 18. Thus, an image frame 18A for which magnetic information is read via the read head 44, another image frame 18A for which magnetic information is recorded via the record head 46, and the print sizes of these image frames 18A are identified. Also, each of the image frames 18A is precisely positioned at the opening 34.

While the negative film 18 is being fed forward at a constant speed, the read head 44 reads magnetic information from the magnetic track 28 of the magnetic film 18 corresponding to each of the image frames 18A, and also the sensor unit 50 detects optical information or the like. These kinds of information collected are accumulated in the printing control unit 80. On completion of the forward feed of the negative film 18, the feed direction of the negative film 18 reverses. In the backward feed of the negative film 18, the negative film 18 is fed intermittently such that each of the image frames 18A is positioned at the opening 34 to undergo exposure and that the recording head 46 contacts a strip of the magnetic track 28 which slides on the recording head 46 at a constant speed, thereby recording magnetic information onto the magnetic track 28.

As shown in FIG. 2, in the printer processor 10, a mirror 52 is disposed on the optical axis of the main exposure section 16 such that the mirror 52 can be advanced into and retracted from the optical axis. The mirror 52 reflects part of light which has passed through an image recorded on the negative film 18.

A density measuring unit 54 is disposed on the optical path of light reflected by the mirror 52, so as to measure transmission density of an image in each image frame 18A of the negative film 18.

A density calculating unit 56 is connected to the density measuring unit 54 so as to measure a light accumurated transmission density (LATD). A monitor 58 is connected to the density calculating unit 56 so as to display an exposed image for inspection by an operator.

As shown in FIG. 2, the sub-exposure section 60 is provided with the liquid crystal panel 62 as an image displaying means. The liquid crystal panel 62 is connected to the printing control unit 80 via a liquid crystal panel driver 64.

The liquid crystal panel 62 is composed of a number of orderly arrayed pixels (e.g. about 510,000 pixels) each of which can become transparent or opaque, or have an intermediate density by an electric means. The liquid crystal panel driver 64 is connected to the printing control unit 80 via a negative image storage unit (not shown). Image information regarding the negative film 18 is temporarily stored in the negative image storage unit and then sent to the printing control unit 80. Based on the thus received image information, the printing control unit 80 arranges frame images under a predetermined rule to form an index print image XP. The liquid crystal panel driver 64 is adapted to choose partial image data representing a predetermined number of frames from the index print image data and to display the partial image data on the liquid crystal panel 62 as a division image X.

Thus, images recorded on the negative film 18 are stored as image information in the not-shown negative image storage unit. Based on the stored image information, each of the frame images is reduced in size and arrayed under a predetermined rule, thereby forming the index print image XP. The resulting index print image XP is divided into division images X each comprising a predetermined number of image frames. Each of the thus formed division images X is displayed on the liquid crystal panel 62 via the liquid crystal panel driver 64. The displayed image is transferred on the photographic printing paper 72 through exposure using light from the light source of the sub-exposure section 60.

As shown in FIG. 2, the elongated photographic printing paper 72 is disposed in the printing section 70, which is located at a position corresponding to downstream ends of he optical paths of the main exposure section 16 and the sub-exposure section 60.

The photographic printing paper 72 is held between photographic printing paper feed rollers 74 which are rotated by a feed drive motor (not shown). By the feed rollers 74, the photographic printing paper 72 is positioned successively at the printing positions of the main exposure section 16 and the sub-exposure section 60 and is then transported in the direction of the arrow of FIG. 2.

The photographic printing paper feed rollers 74 are connected to the printing control unit 80 via a feed control unit 76. Following an instruction from the feed control unit 76, the photographic printing paper feed rollers 74 feed the photographic printing paper 72 so as to precisely bring an image to the printing position in each of the main exposure section 16 and the sub-exposure section 60.

As described above, various kinds of image information are input to the printing control unit 80, which, based on the input information, controls printing so as to print an image onto the photographic printing paper 72 at a proper amount of exposure. Also, as will be described later, the printing control unit 80 determines the printing order of images and adjusts the amount of feed of the photographic printing paper 72 so as to precisely print images onto the photographic printing paper 72 in accordance with the determined order.

In the main exposure section 16, magnetic information corresponding to each of the image frames 18A of the negative film 18 is read while the negative film is fed forward, and the read information is accumulated. On completion of reading magnetic information regarding all image frames 18A, the negative film 18 is fed backward to position each of the image frames 18A to the opening 34. After measuring and adjusting the density of the image frame 18A positioned at the opening 34, the image recorded in the image frame 18A is printed onto the photographic printing paper 72, which has been fed a predetermined amount by the photographic printing paper feed rollers 74 so that the image is printed at a predetermined printing position on the photographic printing paper 72.

In the sub-exposure section 60, the division images X of the index print image XP, which are formed of all images of the negative film 18 stored in the printing control unit 80, are sequentially displayed on the liquid crystal panel 62. The thus sequentially displayed division images X are printed onto the photographic printing paper 72, which has been fed a predetermined amount by the photographic printing paper feed rollers 74 so that each of the division images X is printed at a predetermined printing position on the photographic printing paper 72.

Figure 6:
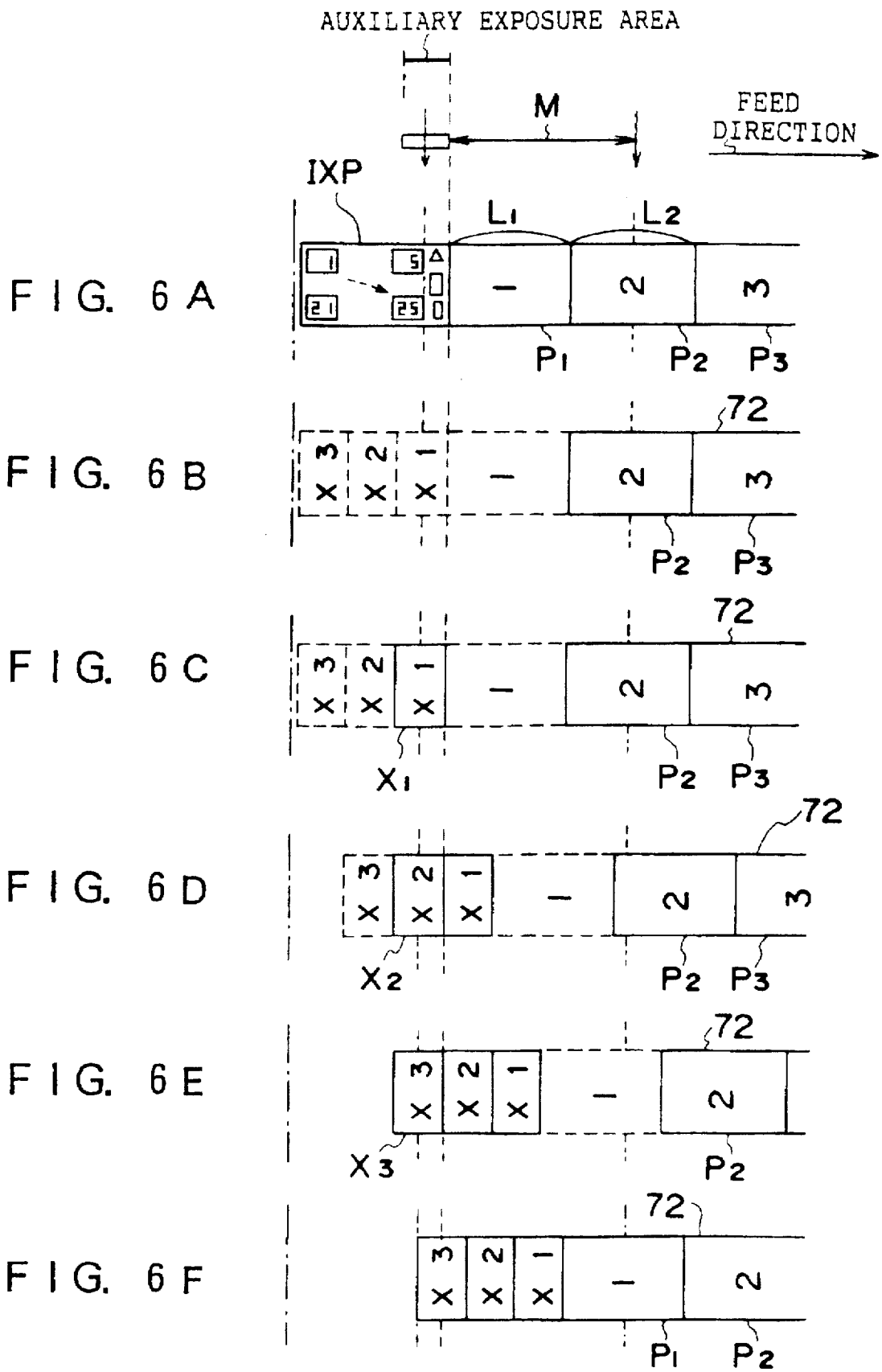
FIG. 6A is a schematic plan view of photographic printing paper illustrating a presumed layout of images printed thereonto according to the first embodiment.
FIGS. 6B through 6F are schematic plan views of photographic printing paper illustrating a sequence of printing images thereonto according to the first embodiment.

As shown in FIG. 6A, in the printer processor 10, the main exposure section 16 and the sub-exposure section 60 are disposed in the following manner. Taking the length of the last image $P_1$ in a group of images to be subjected to exposure at the main exposure section 16 as $L_1$ and the length of the second last image $P_2$ as $L_2$, the exposure area at the sub-exposure section 60 is positioned such that the exposure area is separated from the optical axis of the main exposure section 16 by at least a minimum distance of $L_1+L_2/2$. As a result, after the image $P_2$ undergoes exposure at the main exposure section 16, at least the printing position on the photographic printing paper 72 corresponding to the first division image $X_1$ of the index print image XP enters the exposure area of the sub-exposure section 60 before the image $P_1$ reaches the exposure area in the main exposure section 16.

Accordingly, ordinary images and the division images of the index print image XP are printed at the main exposure section 16 and the sub-exposure section 60, respectively, in the order which is obtained from the print length of each of the image $P_1$, the image $P_2$, and division images X of the index print image XP in accordance with the following equations.

$$L_1 + L_2/2 \geq M \tag{1}$$

$$L_1/2 + Ia + \sum_{i=1}^{n-1} I_i < M \tag{2}$$

$$L_1/2 + Ia + \sum_{i=1}^{n} I_i \geq M \tag{3}$$

where

M: the distance between the optical axis of the main exposure section 16 and the exposure area of the sub-exposure section 60

$L_1$: the print length of image $P_1$ $L_2$: the print length of image $P_2$

Ia: the length of header Xa of index print $I_i$: the print length of division image $X_i$ of index print image XP $X_{MAX}$: the last division image Eq. (1) represents the positional relationship between the main exposure section 16 and the sub-exposure section 60. Eqs. (2) and (3) are used for obtaining a division image $X_n$ which undergoes exposure before the last image $P_1$ undergoes exposure. In the present embodiment, the index print image XP contains the header Xa, but the header Xa may be omitted. As a result of calculation in accordance with Eqs. (1), (2'), and (3), images are printed in the order of $P_2$, Xa, $X_1, X_2, \ldots, X_{n-1}, P_1, X_n, X_{n+1}, \ldots,$ and $X_{MAX}$.

Since the minimum print length of image P is 130 mm (including a header), when the distance M is set to 195 mm, the image $P_2$ is printed always before the division images X of the index print image XP are printed even though the print length of each of the image P and the division image X is changed.

In FIGS. 6A through 6F where the distance M is 195 mm, the image $P_2$ is first printed (FIG. 6B). Assuming print length of image $P_1=158$ mm, Ia=0 mm, and $I_n=28.5$ mm, Eq. (2) and (3) provides n=4, indicating that the image $P_1$ is to be printed before the division image $X_4$ is printed. Accordingly, the division images $X_1$, $X_2$, and $X_3$ are printed before the image $P_1$ is printed (see FIGS. 6C to 6E). Then, before the division image $X_4$ is printed, i.e. after the division image $X_3$ is printed, the image $P_1$ is printed (see FIG. 6F). After the image $P_1$ is printed, if there remains a division image(s) X to be printed, the division image(s) X will be printed adjacent to the printed division image $X_3$.

The number of the division images X to be printed prior to the image $P_1$ depends on the print length of the image $P_1$. Hence, in the case where the print length is fixed for the division images X of the index print image XP and the header Xa, as the print length of the image $P_1$ decreases, the number of the division images X to be printed prior to the image $P_1$ increases; on the contrary, as the print length of the image $P_1$ increases, the number of the division images X to be printed prior to the image $P_1$ decreases.

The operation of the present embodiment will now be described.

In the main exposure section 16, the negative film 18 is loaded onto the negative film carrier 20, and then the negative film 18 is fed forward along the transport path 38 at a constant speed from the cartridge loading portion 30 to the film receiving portion 32. While the negative film 18 is fed forward, magnetic information and information regarding the image size, the presence/absence of an image, etc. corresponding to each of the image frames 18A of the negative film 18 are read, and the thus read pieces of information are transmitted to the printing control unit 80. Also, while the negative film 18 is fed forward, the recording of magnetic information is checked.

All images recorded on the negative film 18 are stored into the negative image storage unit (not shown) and then transmitted to the printing control unit 76. Based on the received images, the printing control unit 76 forms the index print image XP and divides the resulting index print image XP into a plurality of division images X, which are printed onto the photographic printing paper 72.

On completion of reading information regarding all image frames 18A, the last image frame 18A is positioned at the opening 34, and the feeding of the negative film 18 stops. After density adjustment for the image frame 18A positioned at the opening 34, the image in the image frame 18A is printed onto the photographic printing paper 72 at a predetermined position through exposure using light emitted from the light source of the main exposure section 16. In this printing process, the magnetic information read from the magnetic track 28 and the result of the density adjustment are utilized. On completion of the printing, the negative film 18 is fed intermittently so that the next image frame 18A located between the opening 34 and the film receiving portion 32 is positioned at the opening 34. Each of the image frames 18A which have undergone printing is fed backward and sequentially toward the cartridge loading portion 30. While each of the printed image frames 18A is fed backward, the record head 46 of the magnetic head unit 42 records various kinds of information onto the corresponding magnetic track 28.

On completion of printing each of the images P, the photographic printing paper feed rollers 74 feed the photographic printing paper 72 in accordance with an instruction from the feed control unit 76.

In the sub-exposure section 60, each of the division images X of the index print image XP is displayed on the crystal liquid panel 62 to undergo exposure. On completion of the exposure, the photographic printing paper 72 is fed by a predetermined amount.

Figure 7:
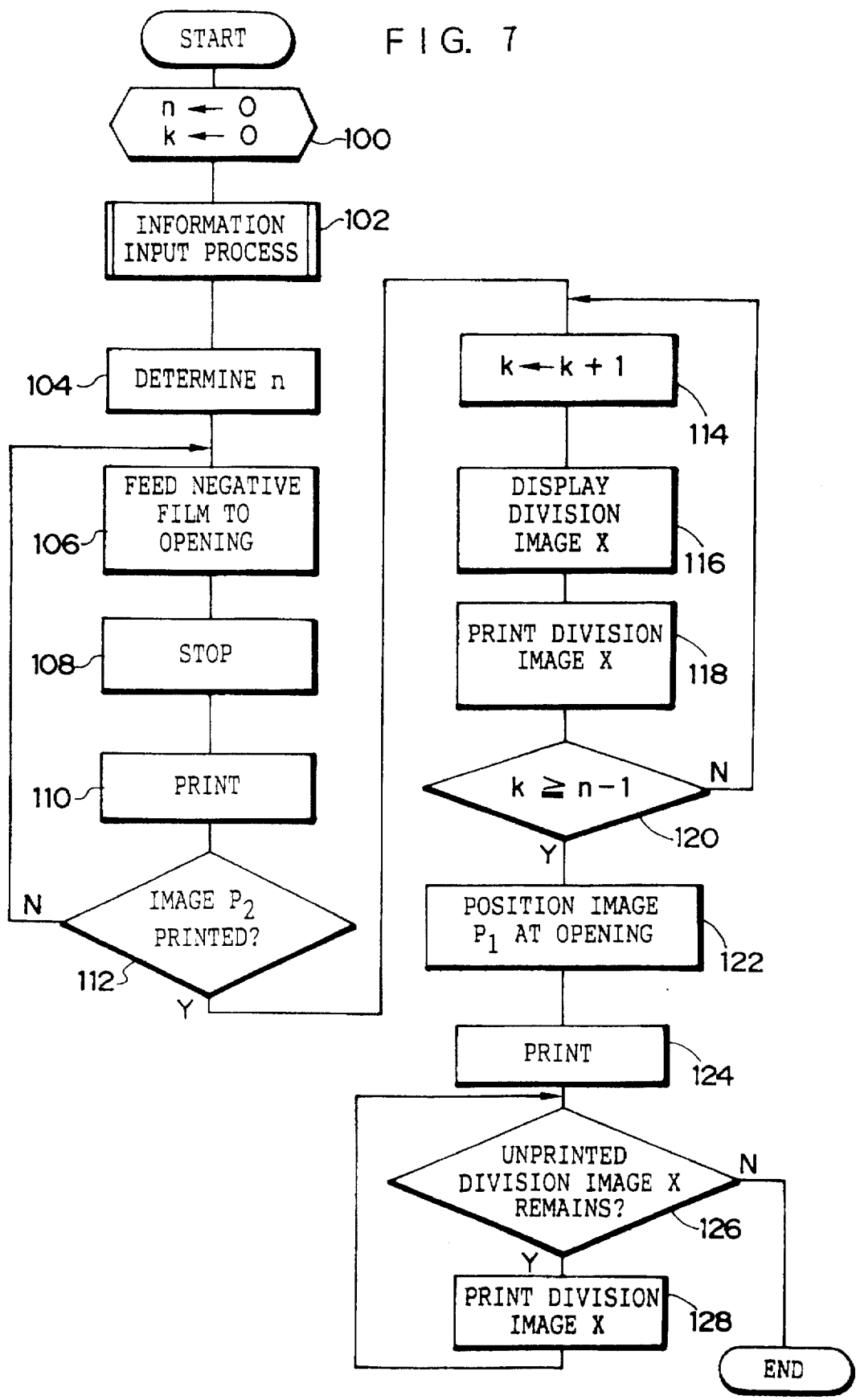
FIG. 7 is a flowchart illustrating an image printing method according to the first embodiment.

The printing of the images P and the division images X will now be described with reference to FIG. 7.

In step 100, the value of n which is used to obtain the number (n−1) of division images X to be printed before the image $P_1$ is printed, and the value of k indicative of the number of printed division images X are reset. In step 102, the magnetic information read from the magnetic tracks 28, the optical information detected by the sensor unit 50, and the image data stored in the negative image storage unit are input into the printing control unit 80.

Then, in step 104, the value of n indicative of the number of the division image X to be printed after the image $P_1$ is printed is determined. Assuming distance M=195 mm, print length of image $P_1=158$ mm, Ia=0 mm, and $I_n=28.5$ mm, Eq. (2) and (3) provides n=4, indicating that the image $P_1$ is to be printed before the division image $X_4$ is printed.

Then, in step 106, the negative film 18 is fed along the transport path 38 on the negative film carrier 20 until the image frame 18A whose information has been last read reaches the opening 34. In step 108, the feeding of the negative film 18 is stopped to thereby complete positioning the image frame 18A at the opening 34.

Upon completion of positioning, the processing moves to step 110, in which the main exposure section 16 prints the image P onto the photographic printing paper 72, based on information entered into the printing control unit 80. On completion of printing the image P, it is judged in step 112 whether or not the printed image P is the image $P_2$, which serves as a reference. If, in step 112, it is judged that the printed image P is not the image $P_2$ then a negative judgment is made, so that the processing returns to step 106. Again, the negative film 18 is fed intermittently so as to perform printing on the next image frame 18A.

If, in step 112, it is judged that the printed image P is the image $P_2$, an affirmative judgment is made, so that the processing proceeds to step 114, where the value of k is incremented. Then, in step 116, the first division image $X_1$ of the index print image XP is displayed on the liquid crystal panel 62 in the sub-exposure section 60. In step 118, the division image $X_1$ undergoes printing by exposure using light from the light source of the sub-exposure section 60.

Then, in step 120, it is judged whether or not the value of k is in excess of (n−1); that is, it is judged whether or not the division image $X_{(n-1)}$ to be printed immediately prior to the image $P_1$ has been printed. When the value of k is not in excess of (n−1), i.e. when the division image $X_{(n-1)}$ to be printed immediately prior to the image $P_1$ is not printed, a negative judgment is made, so that the processing returns to step 114. Again, the sub-exposure section 60 performs printing on the division image X.

When the value of k has exceed (n−1), i.e. when the division image $X_{(n-1)}$ to be printed immediately prior to the image $P_1$ has been printed, the processing proceeds to step 122. In step 122, the negative film 18 is fed along the transport path 38 so as to position the image frame 18A containing the image $P_1$ at the opening 84. In step 124, the main exposure section 18 performs printing for the image $P_1$.

Then, in step 128, it is judged whether or not there remains the division image X to be printed in the sub-exposure section 60.

If, in step 126, it is judged that there remains the unprinted division image X, then an affirmative judgment is made, so that the processing proceeds to step 128. In step 128, the division image X is printed. Then, the processing returns to step 126. This routine is repeated until all the division images X are printed.

When, in step 126, it is judged that there remains no division image X to be printed, a negative judgment is made, thereby completing a series of printing processes.

Thus, the division images X of the index print image XP and the images P recorded in the corresponding image frames 18A of the negative film 18 are printed in an order different from the order of their printing positions on the photographic printing paper 72. Therefore, it is possible to efficiently print the images P and the index print image XP onto the common photographic printing paper 72 based on the print length of the last image $P_1$, without leaving an unprinted zone on the photographic printing paper 72.

In the present embodiment, the negative film 18 allowing magnetic information to be recorded thereonto and the negative film carrier 20 capable of reading/recording magnetic information are used. However, even when an ordinary negative film and an ordinary negative film carrier are used together, ordinary images and an index print image can be printed onto a common photosensitive material in the same manner. In this case, information regarding the print size of each of images to be printed, or the like, can be input to the printing control unit 80 using an optical sensor or a densitometer or the like.

In the present embodiment, ordinary print images and an index print image which is previously divided in divisions are printed without leaving any blank area therebetween by using two exposure sections. However, the present invention is not limited thereto, and is applicable to other types of printer processors if their upstream exposure sections can divide an image into division images before printing.

Second embodiment

In the first embodiment, all image frames 18A of the negative film 18 are subjected to printing while in the second embodiment, the image frames 18A are selectively subjected to printing. Those image frames 18A are automatically rejected on which no image is recorded and which will not provide satisfactory print due to poor exposure at the time of recording.

In the printer processor according to the second embodiment, a function of selecting image frames 18A is added to the printer processor according to the first embodiment.

Figure 8:
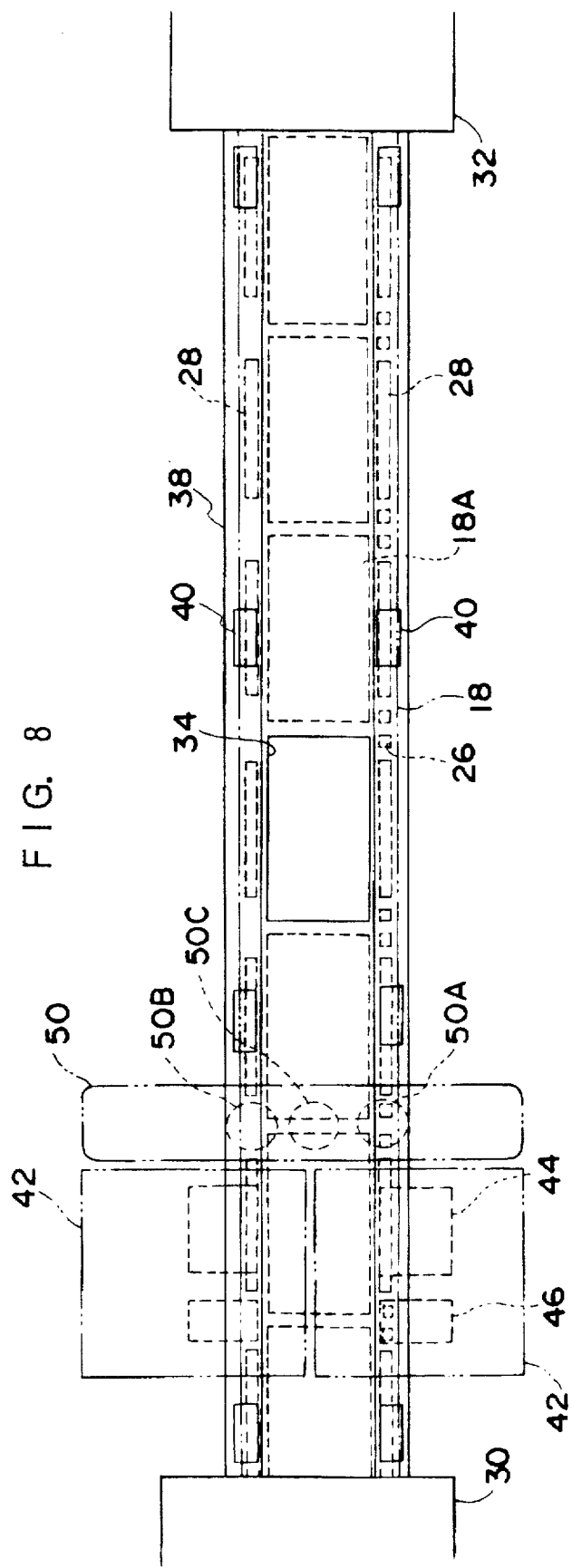
FIG. 8 is a schematic plan view illustrating the transport path and its peripherals of a negative film carrier according to a second embodiment of the present invention.

As shown in FIG. 8, the sensor unit 50 of the second embodiment has three sensors 50A, 50B, and 50C. The optical sensor 50A detects the perforation 26 indicative of the position of each of the image frames 18A formed on the negative film 18 so as to identify the image frame 18A corresponding to magnetic information read by the read head 44 or the image frame 18A corresponding to magnetic information to be recorded by the record head and to precisely position each of the image frames 18A at the opening 34. The optical sensor 50B detects the code 17 provided on the negative film 18. The optical sensor 50C is provided such that it faces the film 18 at the lateral center of the transport path 38. The optical sensor 50C measures the density of an image in each image frame 18A.

In the sub-exposure section 60, the liquid crystal panel 62 displays each of the division images X of an index print image XP, which is composed of images which are selected from those recorded on the negative film 18 and accumulated in the printing control unit 80. The thus displayed division images X are printed onto the photographic printing paper 72. The photographic printing paper 72 is fed by a predetermined amount by the photographic printing paper feed rollers 74, and a corresponding division image X is printed thereonto at a predetermined printing position, which is located under the printing area around the optical axis of the sub-exposure section 60. The index print image XP contains a header as well as images recorded on the negative film 18.

Based on various kinds of information received, the printing control unit 80 selects images to be printed. A group of image frames 18A of the negative film 18 subjected to printing do not contain image framed 18A on which no image is recorded (a blank frame) as well as the image frame 18A which will not provide a satisfactory image even when printed at an exposure time increased or decreased to a predetermined extent (a poor exposure frame), because these defective frames do not provide proper prints when printed onto the photographic printing paper 72.

While the negative film 18 is fed along the transport path 38 of the negative film carrier 20, the optical sensor 50C of the sensor unit 50 measures the density of each of images recorded on the negative film 18, and the measured density information is input to the printing control unit 80. A blank frame is detected as an image having the maximum transmission density of the negative film 18. A poor exposure frame is detected as an image whose transmission density falls outside the range of transmission density within which the image P can be printed properly onto the photographic printing paper 72 by adjusting the exposure time between predetermined maximum and minimum exposure times. Thus, the image P recorded on the image frame 18A whose transmission density falls in a predetermined range is selected as an image to be printed.

The amount of feed of the photographic printing paper 72 is determined based on the print length of the image P to be printed. For the image frame 18A not selected for printing, the amount of feed of the photographic printing paper 72 is set to 0. After a certain selected image P is positioned and printed at the opening 34 of the negative film carrier 20, the next selected image P is brought to the opening 34 by feeding the photographic printing paper 72 by half of the total print length of these two images P.

The printing control unit 80 selects printable images from the received all images recorded on the negative film 18 and arrays in a matrix only the selected images, thereby forming the index print image XP. The resulting index print image XP is divided into a plurality of division images X based on the size of the liquid crystal panel 62. Each of the division images X is sequentially displayed on the liquid crystal panel 62, and the displayed image is printed onto the photographic printing paper 72, thereby producing the index print.

In the printer processor 10, the main exposure section 16 and the sub-exposure section 60 are disposed a predetermined distance apart from each other. The photographic printing paper 72 first passes the exposure area of the sub-exposure section 60.

Figure 9:
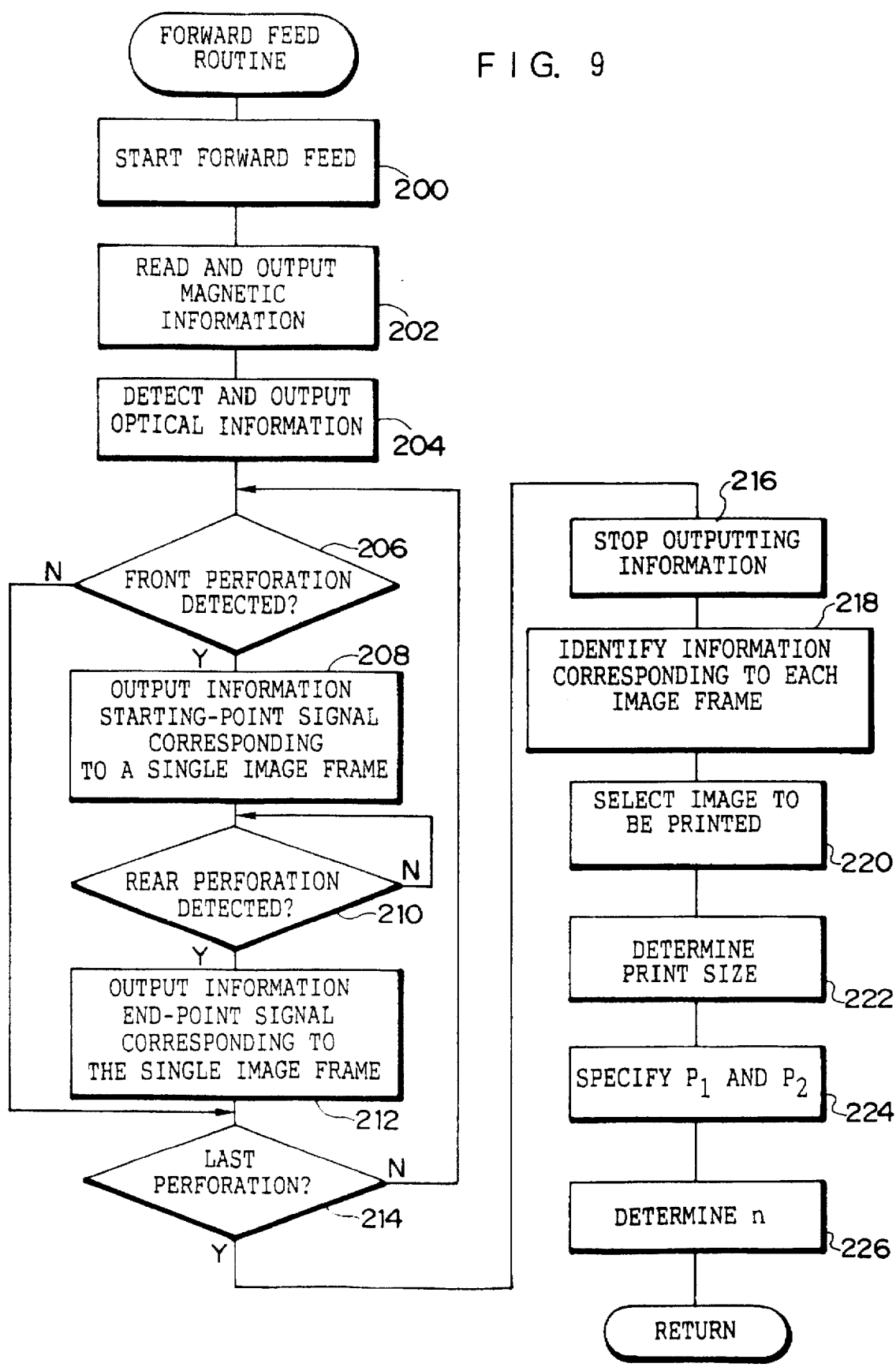
FIG. 9 is a flowchart illustrating a method of selecting images according to the second embodiment.

The above-described process of selecting images is performed by the printing control unit 80 while the negative film 18 is fed forward on the negative film carrier 20. Next, this selecting process will be described with reference to FIG. 9.

When the negative film 20 is loaded onto the negative film carrier 20, in step 200, the negative film 20 starts to be fed along the transport path 38 at a constant speed from the cartridge loading portion 30 toward the film receiving portion 32 (forward feed).

Then, in step 202, the printing control unit 80 instructs the read head 44 to read magnetic information and to output the read magnetic information to the printing control unit 80. The read head 44 contacts the magnetic track 28 of the negative film 18 which slides on the read head 44, reads magnetic information, if recorded, from the magnetic track 28, and outputs the read magnetic information.

Then, in step 204, the printing control unit 80 instructs the sensor unit 50 to detect optical information and to output the detected optical information to the printing control unit 80. In response to the instruction, the optical sensors 50A, 50B, and 50C are activated to get ready for detecting various kinds of optical information, and output information, if detected, to the printing control unit 80.

Then, in step 206, it is judged whether or not the front perforation 26 of the image frame 18A, provided at the front side of the frame 18A in the feeding direction of the negative film 18, is detected. When the front perforation 26 travels along the transport path 38 and passes under the optical sensor 50 A, the optical sensor 50A detects it, and thus a judgment of YES is formed, so that the processing proceeds to step 208. In step 208, in addition to various kinds of information output continuously by the read head 44 and the sensor unit 50, an information starting-point signal, which indicates that information following the start-point signal is for a single image frame 18A, is output. If, in step 206, it is judged that the perforation 26 is not detected, then the processing proceeds to step 214, which will be described later.

When the information starting-point signal is output, in step 210, it is judged whether or not the rear perforation 26 is detected. As in the case of the front perforation 26, when the rear perforation 26 passes under the optical sensor 50 A, the optical sensor 50A detects it, and thus an affirmative judgment is made, so that the processing proceeds to step 212. In step 212, in addition to various kinds of information, an information end-point signal for identifying information corresponding to a single image frame 18A is output.

When an information end-point signal is output or when the front perforation 26 is not detected in step 206, in step 214, it is judged whether or not the last perforation 26 of the negative film 18 is detected. If, in step 214, it is judged that the last perforation 26 is not detected, then a negative judgment is made, so that the processing returns to step 206, where it is judged whether or not the front perforation 26 is detected.

When pairs of perforations 26 are detected whose number is equal to the number of image frames 18A of the negative film 18, the rear perforation 26 of the last image frame 18A is recognized as the last perforation 26. If, in step 214, it is judged that the last perforation 26 is detected, an affirmative judgment is made, so that the processing proceeds to step 216.

In step 216, the printing control unit 80 instructs the read head 44 and the optical sensors 50A, 50B, and 50C of the sensor unit 50 to stop outputting information. In response to the instruction, the read head 44 stops reading/outputting magnetic information while the optical sensors 50A, 50B, and 50C of the sensor unit 50 are deactivated so as not to output various kinds of optical information.

Then, in step 218, the accumulated information is identified in relation to each of the image frames 18A. For this identification are used the information starting-point signal and the information end-point signal which were generated on detection of the perforation 26 and output to the printing control unit 80. Since the read head 44 and the optical sensor 50A are located at different positions, the magnetic information and the information starting-point and end-point signals are output to the printing control unit 80 with a time lag (offset) therebetween. Accordingly, based on the feeding speed of the negative film 18 and the amount of this offset, a series of time-course continuous information can be divided for each of the image frame 18A, whereby information corresponding to each of the image frames 18A can be identified.

Then, in step 220, based on the identified information, images to be printed are selected. Such images P to be selected are images recorded on the negative film 18 and having densities which falls within a predetermined density range. The image frame 18A containing an image whose density falls outside a predetermined density range as well as a blank frame are not selected.

After a group of images P are selected, in step 222, the print size is determined for each of the selected images P. Based on the determined print sizes, the feed control unit 76 determines the amount of feed of the photographic printing paper 72 required for printing each of the selected images P, and the printing control unit 80 determines division images X which form the index print image XP.

Then, in step 224, from among these selected images P are specified ordinary print images P, the last image $P_1$ (an image to be last printed by the main exposure section 16) and the second last image $P_2$ are selected, based on which the order of printing the division images X is determined.

Then, in step 226, the number n is determined that indicates the division image X which is to be printed immediately after the image $P_1$ is printed. Thus, the process of selecting images, which is performed while the negative film 18 is fed forward, is completed.

Figure 10:
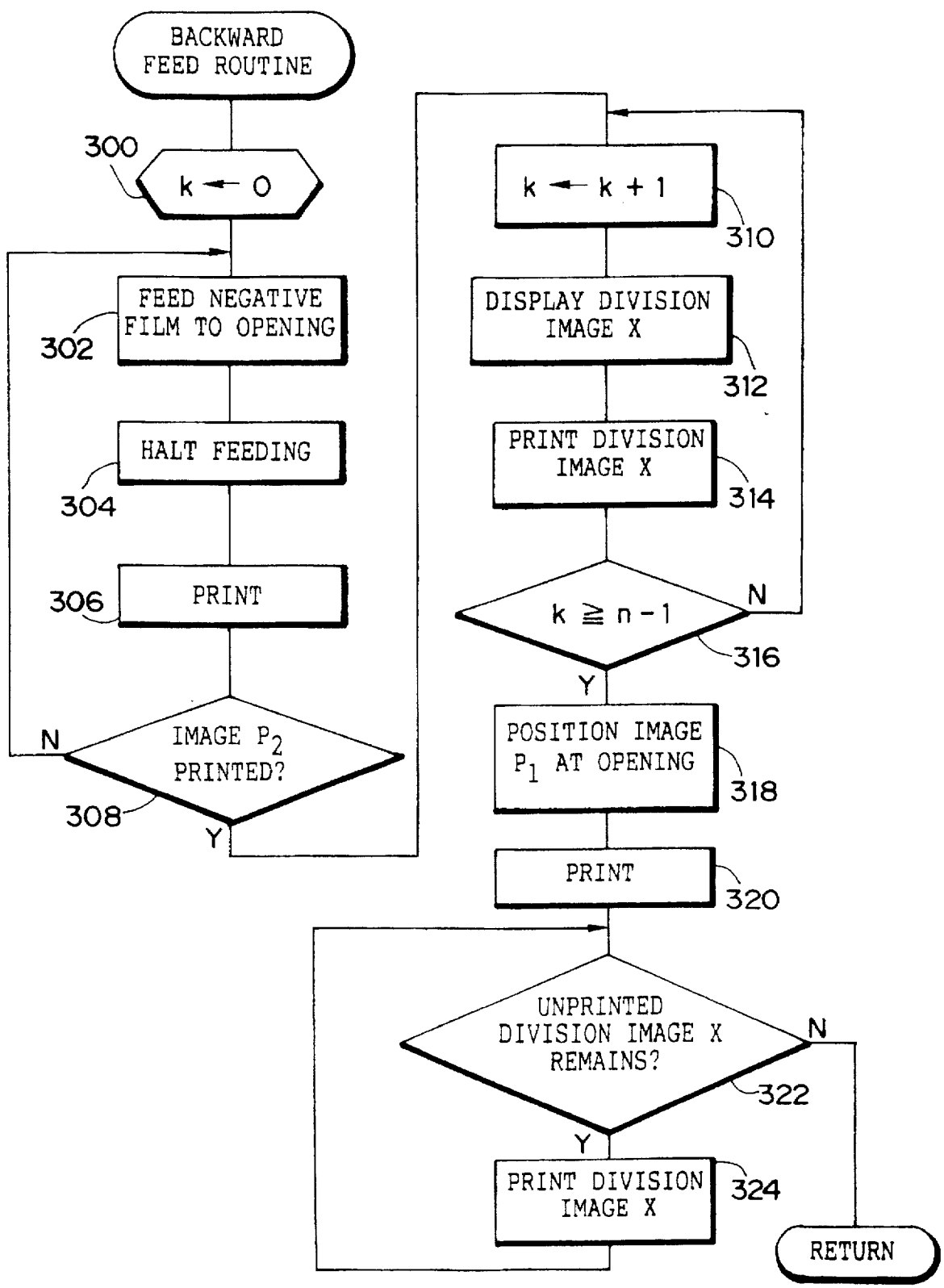
FIG. 10 is a flowchart illustrating an image printing method according to the second embodiment.

A process of printing the image P and the displayed division images X, which is performed while the negative film 18 carried on the negative film carrier 20 is fed backward, will now be described with reference to FIG. 10.

In step 300, the value of k is reset to 0. Then, in step 302, the negative film 18 is fed along the transport path 38 off the negative film carrier 20 until the image P which was last selected (i.e. $P_{MAX}$ to be first printed) among the selected images P is positioned at the opening 34.

When the image P reaches the opening 34, in step 304, the constant-speed feed is halted. The processing proceeds to step 306, where a required amount of the photographic printing paper 72 is fed in accordance with a signal from the printing control unit 80, and then the image P undergoes exposure performed by the main exposure section 16, thereby printing the image P onto the photographic printing paper 72 at a predetermined position.

Then, in step 308, it is judged whether or not the printed image P is the reference image $P_2$. If, in step 308, it is judged that the printed image P is not the image $P_2$, then a negative judgment is made, so that the processing returns to step 302. Again, the negative film 18 is fed intermittently along the transport path 38 of the negative film carrier so as to perform a process of printing the next selected image P.

If, in step 308, it is judged that the image P printed in step 302 is the image $P_2$, then an affirmative judgment is made, so that the processing proceeds to step 310. In step 310, the value of k is incremented. Then, the processing proceeds to step 312, where the first division image $X_1$ of the index print image XP is displayed on the liquid crystal panel 62 of the sub-exposure section 60. In step 314, the displayed division image $X_1$ is printed by using the light source of the sub-exposure section 60.

Then, in step 316, it is judged whether or not the value of k has exceeded (n−1). That is, it is judged whether or not the division image X(n−1), which is to be printed immediately prior to the image $P_1$, is printed. If, in step 316, it is judged that the value of k is not in excess of (n−1), i.e. if it is judged that the division image X(n−1) has not been printed, a negative judgment is made, so that the processing returns to step 310. Again, a process of printing the next division image X is performed by the sub-exposure section 60.

If, in step 316, it is judged that the value of k is in excess of (n−1), i.e. if it is judged that the division image $X_{(n-1)}$ has been printed, an affirmative judgment is made, so that the processing proceeds to step 318. In step 318, the negative film 18 is fed a tong the transport path 38 so as to position the image frame 18 containing the image $P_1$ at the opening 34. Then, in step 320, the image P1 is printed by the main exposure section 16.

Then, in step 322, it is judged whether or not there remains any other division image X which is not printed by the sub-exposure section 60.

If, in step 322, it is judged that there remains such an unprinted division image X, then an affirmative judgment is made, so that the processing proceeds to step 324, where the remaining unprinted division image X is printed. On completion of printing the division image X, the processing returns to step 322. This routine of printing the division image X is repeated until all the division images X are printed.

When there remains no unprinted division image X, in step 322, a negative judgment is made. Thus, a printing process which is performed while the negative film 18 is fed backward ends, thereby completing a series of photographic processes.

Thus, printing is not performed for a blank image frame 18A not containing a recorded image. This accelerates the printing process and prevents waste of the photographic printing paper 72, which would otherwise result due to printing a blank image frame 18A onto the photographic printing paper 72.

Further, the division images X of the index print image XP displayed on the liquid crystal panel 62 and the images P recorded on the corresponding image frames 18A of the negative film 18 can be printed in an order different from that of their printing positions on the photographic printing paper 72. In addition, the images P and the index print image XP can be printed efficiently onto the common photographic printing paper 72 without leaving an unprinted area therebetween.

In the present embodiment, images to be printed are selected based on optical information and magnetic information. However, the present invention is not limited thereto. This selection may be made based on either optical or magnetic information, or other information.

In the present embodiment, information of each image frame 18A, based on which the image P to be printed is selected, is identified based on the information starting-point and end-point signals generated on detection of the perforation 26, and the amount of offset. However, the present invention is not limited thereto. For example, a number may be recorded at the head portion (in the feed-forward direction) of the magnetic track 28 corresponding to each of the image frames 18A so as to identify magnetic information recorded on the magnetic track 28. Alternatively, the read head 44 may output a signal indicative of the unrecorded portion (FIG. 3) having a predetermined length equivalent to the spacing between the image frames 18A, thereby providing the same identifying effect.

In the present embodiment, after one roll of the negative film 18 is fed forward to the end, images to be printed are selected. However, in the case where it is possible to record onto the magnetic track 28, by a camera feature or the like during photographing, a certain indication indicative of the last image P of the negative film 18, the operation can be modified as follows so as to shorten the processing time further. That is, even when the negative film 18 is in process of being fed forward, the reading operation may be halted on detection off a signal indicative of the last image P, immediately followed by selection of images to be printed. Since it is not necessary to feed forward the negative film 18 to the end when the negative film 18 is fed at a constant speed so as to read information from the negative film 18, the photographic processing time can be further reduced.

In the present embodiment, an exposure section located on the upstream side in the feed direction of the photographic printing paper 72 serves as the sub-exposure section 60 for printing the index print image. However, the present invention is not limited thereto, and is applicable to the case where other kind of auxiliary image is printed by the sub-exposure section 60, provided that such image can be printed in a divided manner in an area which do not go beyond the sub-exposure section 60 before the last image $P_1$ reaches the exposure stage of the main exposure section 16. The position of such area varies depending on the size of the last image $P_1$. In this case, the index print image may be divided previously into division images each of which can be printed in a single exposure. Alternatively, based on the print size of the image located immediately before the last image $P_1$, a printable area of the auxiliary image may be determined, and the thus determined image area may be printed before the last image $P_1$ is printed.

In the present embodiment, various kinds of information are read and accumulated while the negative film 18 is fed forward, and printing is performed based on the accumulated information while the negative film 18 is fed backward. However, the present invention is not limited thereto. In the magnetic head unit 42, the position of the read head 44 and the position of the record head 46 may be reversed. Thus, information is read and printing is performed based on the read information while the negative film 18 is fed forward, and information is recorded while the negative film 18 is fed backward. In this case, immediately after information corresponding to each of the image frames 18A is read, it is judged whether or not the image frame 18A contains an image feasible for printing.

What is claimed is:

1. An image printing method comprising the steps of:
    disposing two exposure stages above a common photosensitive material, said two stages being separated from each other by a predetermined distance;
    printing images sequentially at the stage disposed downstream in the feed direction of said photosensitive material;
    locating, at the stage disposed upstream in the feed direction of said photosensitive material, an image to be printed adjacent to the last image to be printed last at said downstream exposure stage;
    wherein the image at said upstream exposure stage is located such that the near edge of the image is located at a position separated from the optical axis of said downstream exposure stage by at least a minimum distance of $L_1+L_2/2$, where $L_1$ is the length of the last image to be printed last at said downstream stage and $L_2$ is the length of an image preceding the last image; and
    determining based on $L_1$ and $L_2$, an image to be printed at said upstream exposure stage prior to the last image to be printed at said downstream exposure stage.

2. An image printing method according to claim 1, wherein said image to be printed at said upstream exposure stage is previously divided into a plurality of division images, and further comprising the step of determining for each of the division images whether or not the division image is printed at said upstream exposure stage before the last image is printed at said downstream image.

3. An image printing method according to claim 1, wherein said image to be printed at said upstream exposure stage is an index print image, and further comprising the step of determining an n which satisfies the following Eqs. (i) and (ii):

$$L_1/2 + \sum_{i=1}^{n-1} l_i < M \quad \text{(i)}$$

$$L_1/2 + \sum_{i=1}^{n} l_i \geq M \quad \text{(ii)}$$

and printing images in the order of $P_2, X_1, X_2, \ldots, X_{n-1}, P_1, X_n, X_{n-1}, \ldots,$ and $X_{MAX}$, where $l_i$ is the length of division image $X_i$, MAX is the maximum value of i, $L_1$ is the length of the last image $P_1$, $L_2$ is the length of the second last image $P_2$, and M is the minimum value of $L_1+L_2/2$.

4. An image printing method according to claim 2, wherein said image to be printed at said upstream exposure stage is an index print image, and further comprising the step of determining an n which satisfies the following Eqs. (i) and (ii):

$$L_1/2 + \sum_{i=1}^{n-1} l_i < M \quad \text{(i)}$$

$$L_1/2 + \sum_{i=1}^{n} l_i \geq M \quad \text{(ii)}$$

and printing images in the order of $P_2, X_1, X_2, \ldots, X_{n-1}, P_1, X_n, X_{n-1}, \ldots,$ and $X_{MAX}$, where $l_i$ is the length of division image $X_i$, MAX is the maximum value of i, $L_1$ is the length of the last image $P_1$, $L_2$ is the length of the second last image $P_2$, and M is the minimum value of $L_1+L_2/2$.

5. An image printing method comprising the steps of:
 disposing two exposure stages above a common photosensitive material, said two stages being separated from each other by a predetermined distance;
 printing images sequentially at the stage disposed downstream in the feed direction of said photosensitive material;
 locating, at the stage disposed upstream in the feed direction of said photosensitive material, an image to be printed adjacent to the last image to be printed last at said downstream exposure stage;
 selecting images to be printed at said downstream exposure stage, through a judgment based on image information obtained from the photographic film;
 specifying, among the selected images, a last image to be printed last, and a second last image to be printed before the last image is printed; and
 determining, based on the sizes of the last image and the second last image, an image to be printed at said upstream exposure stage prior to the last image.

6. An image printing method according to claim 5, wherein the image information used n said judgment is either magnetic information or optical information recorded on the photographic film, and further comprising the steps of:
 feeding the photographic film forward and backward;
 reading said image information from the photographic film while the film is fed forward; and
 printing images while the film is fed backward.

7. An image printing method according to claim 5, wherein said image to be printed at said upstream exposure stage is an index print image composed of said selected images, said index print image is previously divided into a plurality of division images, and further comprising the step of determining for each of the division images whether or not the division image is to be printed before the last image is printed.

8. An image printing method according to claim 6, wherein said image to be printed at said upstream exposure stage is an index print image composed of said selected images, said index print image is previously divided into a plurality of division images, and further comprising the step of determining for each of the division images whether or not the division image is to be printed before the last image is printed.

* * * * *